United States Patent
Parthasarathy et al.

(10) Patent No.: US 12,242,865 B2
(45) Date of Patent: Mar. 4, 2025

(54) ASSOCIATING TAGS TO CONFIGURATION ITEMS FOR TAG-BASED CONFIGURATION MANAGEMENT

(71) Applicant: Arista Networks, Inc., Santa Clara, CA (US)

(72) Inventors: Prasanna Parthasarathy, Cupertino, CA (US); Navdeep Bhatia, Sunnyvale, CA (US); Hua Zhong, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 179 days.

(21) Appl. No.: 17/976,268

(22) Filed: Oct. 28, 2022

(65) Prior Publication Data

US 2024/0143342 A1 May 2, 2024

(51) Int. Cl.
*G06F 9/44* (2018.01)
*G06F 9/445* (2018.01)

(52) U.S. Cl.
CPC ................... *G06F 9/4451* (2013.01)

(58) Field of Classification Search
CPC .................. G06F 1/32; G06F 1/12; G06F 9/44
See application file for complete search history.

(56) References Cited

U.S. PATENT DOCUMENTS

| | | | |
|---|---|---|---|
| 6,529,985 B1 * | 3/2003 | Deianov | G06F 9/54 718/107 |
| 7,565,416 B1 | 7/2009 | Shafer | |
| 9,094,299 B1 | 7/2015 | Rao | |
| 2003/0225867 A1 * | 12/2003 | Wedlake | H04L 41/0893 709/222 |
| 2019/0205924 A1 * | 7/2019 | Rusiecki | G06Q 30/0276 |

OTHER PUBLICATIONS

European Search Report for Application No. EP 23206373.5, dated Feb. 29, 2024, 10 pages.
CloudVision Configuration Guide, retrieved at https://usermanual.wiki/m/e08e11ab5573702dc4a438a70235f10b388c5616893d083e02344cb682399d4c.pdf, Arista Networks, Inc., Santa Clara, CA, Version 2020.3.0 v1, Feb. 2021, 388 pgs.

* cited by examiner

*Primary Examiner* — Keshab R Pandey
(74) *Attorney, Agent, or Firm* — Sprinkle IP Law Group

(57) ABSTRACT

Systems, methods and products for associating arbitrary configuration tags to configuration item for a service so that items grouped by the tags can be unconfigured or manipulated as a group with minimal touchpoints. In one embodiment, a method is provided for managing the configuration of per-tenant features in a server system. The method includes identifying a configuration feature of the server system to be configured for a specific tenant. A configuration command is received to configure the configuration feature for the specific tenant, wherein the configuration command includes a configuration tag associated with the specific tenant. The configuration command is stored in a configuration of the server system and is applied to the server system. Tag-based commands are provided which are operable to modify a subset of configuration features corresponding to a designated configuration tag.

20 Claims, 5 Drawing Sheets

Single tag-based command:
    <tag-based indicator> <operation> <tag>

ASSOCIATING TAGS TO CONFIGURATION ITEMS FOR TAG-BASED CONFIGURATION MANAGEMENT

TECHNICAL FIELD

Embodiments disclosed herein relate generally to techniques for configuring computer systems, and more particularly to techniques for tagging configuration items to facilitate removal or modification of configuration items associated with specific users.

BACKGROUND

Various systems which provide services to customers are capable of providing disparate features of the services on a per-customer basis. In other words, features which are provided to one of the customers may not be provided to others of the customers. Similarly, features which are configured in a particular manner for a first customer may be differently configured for a second customer.

For example, when a customer is onboarded (i.e., when the customer is first introduced or integrated into the system), it may be necessary to allocate and configure the services for that particular customer. For example, it may be necessary to create and configure a set of customer facing interfaces. It may also be necessary to transport the interfaces to the customer using means such as VXLAN encapsulation and providing routing information.

This requires multiple independent configuration touchpoints—the customer facing interface has to be configured, a static route has to be configured, a VRF has to be obtained for the customer facing interface and then a static route has to be created from the VRF that defines how to transport packets from the interface to a particular endpoint for a gateway device within a cloud network. In addition to providing a route to the gateway device, routing protocols between the customer and the gateway device must be provided for control purposes.

Thus, it is necessary to separately configure a number of BGP related configuration items for each onboarded customer. Configuration of each of these items is accomplished through the use of a corresponding configuration item. These items are stored in a configuration file that includes the configuration items for all of the different customers of the service.

In some instances, it may become necessary to deprovision a customer from the service, or to modify the configuration of the service's features for a particular customer. There is not an abstraction across all of the per-customer features that allows the set of configurations for a particular customer to be easily identified, so it is necessary to individually remove or modify the specific items that were added to the configuration file for the customer. Because there may be thousands of individual items in the configuration file, it can be a tedious and time consuming task to determine which of the items need to be de-configured (e.g., removed or modified), and it often requires some form of higher-level tool outside of the service to accomplish this.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
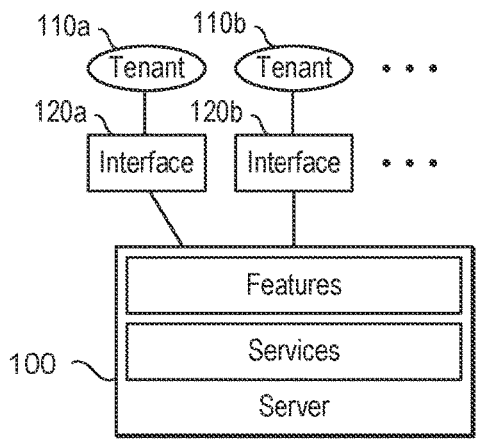
FIG. 1 is a diagram illustrating a general environment in which some of the embodiments disclosed herein are implemented.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

In light of the problems with existing techniques for configuring computer systems, it would be desirable to provide systems, methods and products to enable the deconfiguration or modification of groups of configuration items (e.g., items corresponding to a particular customer) which require fewer touchpoints (and preferably a single touchpoint).

Embodiments disclosed herein provide the ability to associate an arbitrary configuration tag to any configuration item for a service so that all those items grouped by the tags can be unconfigured or manipulated with minimal touchpoints, and preferably a single touchpoint (e.g., a single command).

Embodiments of the invention use arbitrary configuration tags which are appended to configuration items in a configuration file for the service. This enables the items to be grouped together according to the configuration tags so that groups of configuration items can be quickly identified and unconfigured or otherwise manipulated as a group with a single tag-based item (i.e., an item that is defined as operating on configuration items that include a specified tag). The desired tag-based items can be written and added to the service as files that are loaded by the handler for the configuration items (e.g., a command handler in a system in which configuration items are entered into the configuration as commands). In one embodiment, the configuration tags include identifiers of customers associated with the respective configuration commands so that with a single tag-based command, a desired operation can be performed on a group of configuration commands that have a tag associated with a given customer. In some embodiments, the tags may include sub-parts ("labels") so that operations can be performed on subgroupings of commands. These subgroupings may include only commands associated with a particular customer, or they may extend across multiple customers.

The use of configuration tags in conjunction with configuration commands reduces the time and effort required to unconfigure or manipulate the configuration of features for a particular customer in comparison to conventional methods which require identifying and manipulating each of the configuration commands individually. In embodiments that use labels within configuration tags, less time and effort may be required to manage the configuration of subgroups of features for one or more customers.

Referring to FIG. 1, a diagram is shown to illustrate a general environment in which some of the embodiments disclosed herein are implemented. As depicted in this figure, a server 100 provides services to a set of tenants 110a-110c. It should be noted that common reference numbers in the figures which are followed by different letters may be referred to herein collectively by the reference number alone (e.g., tenants 110a-110c may be referred to collectively simply as tenants 110). Each of tenants 110 subscribes to one or more of the services provided by server 100, but each of the tenants may subscribe to different service levels, features, etc., so server 100 maintains a separate configuration for each of the tenants. The different features made available to each of the tenants may include, for example, different interfaces 120 to enable access by the tenants to the corresponding subscribed services and features.

Figure 2:
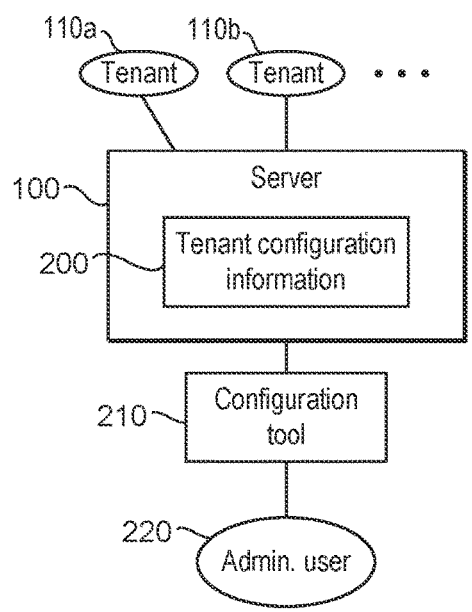
FIG. 2 is a diagram illustrating the maintenance of configuration information for the tenants of a system in accordance with the prior art.

Referring to FIG. 2, a diagram is shown to illustrate the maintenance of configuration information for the tenants of a system in accordance with the prior art. As shown here, server 100 is accessible by subscribed tenants 110. The configuration information for all of the tenants is stored in a configuration 200 maintained within the server. The configuration comprises a set of configuration items which configured the different features of the provided services. Each configuration item configures a specific feature for a specific tenant. The configuration typically includes multiple configuration items for each feature and multiple configuration items for each tenant.

Configuration 200 of Server 100 is maintained by an administrative user 220. Administrative user 220 adds configuration items for a particular tenant when the services are initially provisioned for that tenant, and the administrative user may modify the configuration items as needed during the course of the tenant's subscription to the service in order to update the features of the service which are provided to that specific tenant. Similarly, when a particular tenant is deprovisioned (i.e., when the tenant is unsubscribed from the service), the administrative user must identify and remove the specific configuration items associated with the tenant.

Figure 3:
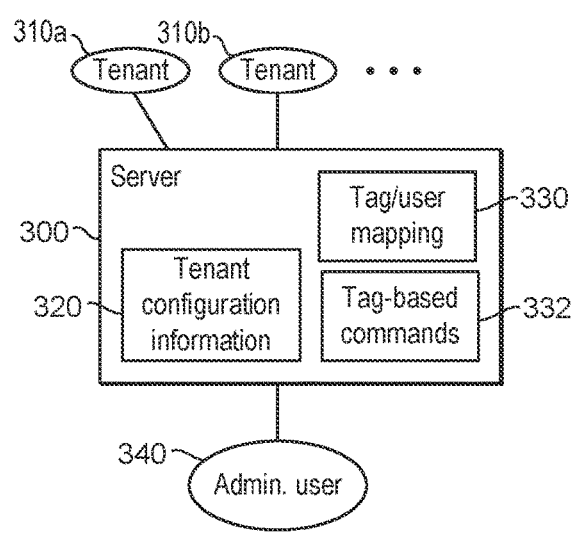
FIG. 3 is a diagram illustrating the maintenance of configuration information for the tenants of a system in accordance with some embodiments.

Conventionally, the administrative user is required to manage the configuration items individually, rather than collectively. In other words, the configuration items are not grouped together within the configuration. Consequently, when it is necessary for the administrative user to update or remove items associated with a particular tenant, the administrative user must identify the specific configuration items associated with the tenant and must individually update or remove the identified configuration items. In some cases, the administrative user may have external configuration tools 210 available which can assist in the management of the configuration items. These external tools, however, may have bugs, and manual configuration of individual features may be prone to errors Referring to FIG. 3, a diagram is shown to illustrate the maintenance of configuration information for the tenants of a system in accordance with some embodiments. As in FIG. 2, a server 300 is accessible by a set of tenants 310 that have subscribed to the services provided by the server. The specific features, service levels, etc. that have been subscribed to by each of the tenants are provided according to a configuration 320 which is maintained in the server. Configuration 320 contains a set of configuration items which control the features that are provided to each tenant, but the configuration items are distinct from the configuration items in traditional systems because they include configuration tags which are associated with the specific tenants. A mapping 330 of the tags to the corresponding tenants is also stored in server 300 so that when it is desired to update or remove configuration items for a particular customer, the configuration tag corresponding to that customer can be identified by an administrative user 340, and then the tag can be used to identify the configuration items which are associated with that particular customer. The identified configuration items can then be updated or removed with as little as a single command. A set of tag-based commands 332 are also defined for use with the configuration tags to allow corresponding operations to be performed on all of the configuration commands associated with a designated configuration tag.

It should be noted that although the example systems and methods described herein focus on multi-tenant computer systems, the disclosure should not be construed as being limiting to these systems. The use of configuration tags and tag-based commands may be implemented outside the context of multi-tenant systems to establish groupings relationship for a sets of configuration commands and to operate on those configurations using a single touchpoint. The present disclosure should therefore be construed to cover non-multi-tenant systems as well.

Figure 4:
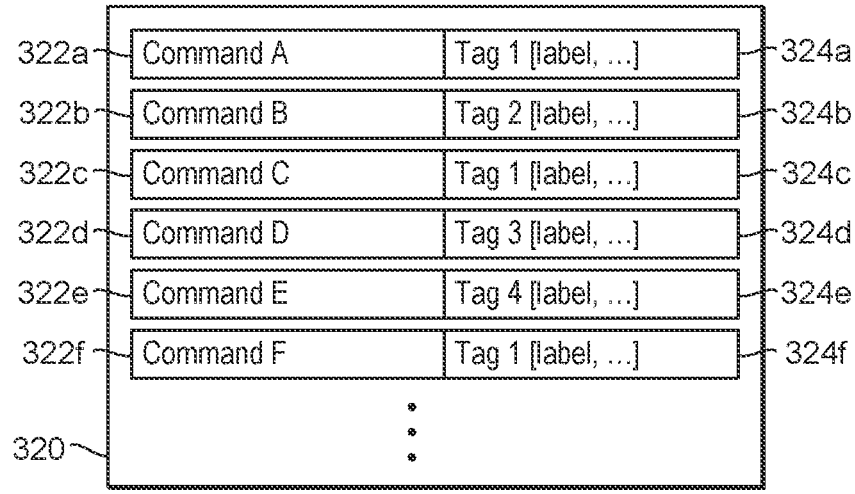
FIG. 4 is a diagram illustrating configuration information for a computer system in accordance with some embodiments.

Referring to FIG. 4, a diagram is shown to illustrate configuration 320 in accordance with some embodiments. As noted above, configuration 320 includes the configuration items that are entered by the administrative user to configure the features of the services provided to the different tenants. In one embodiment, each configuration item has a corresponding command in configuration 320. Each of the configuration commands 322 in configuration 320 has a corresponding configuration tag 324.

In this embodiment, configuration tags 324 are arbitrarily defined for each tenant. A mapping of the configuration tag defined for each tenant is stored by the system so that it can identify configuration commands that are associated with a specific tenant. The system also stores a set of tag-based commands 332 that are defined with the tagged configuration commands. The tag-based commands define and operation to be performed on configuration commands that are tagged with a designated configuration tag. For example, a tag-based command may display all configuration commands with the designated configuration tag, or it may delete, or disable, or enable all configuration commands with the designated configuration tag. Tag-based commands may be defined to perform any appropriate operations on the group of configuration commands associated with the designated configuration tag.

Figure 5:
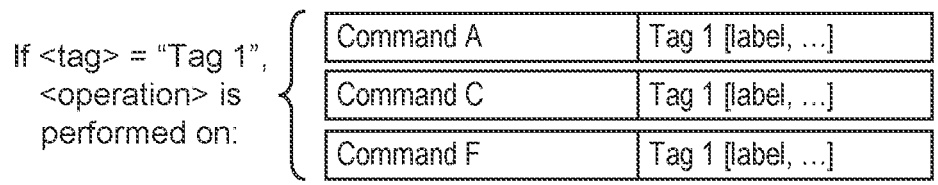
FIG. 5 is a diagram illustrating the use of a tag-based command to perform a designated operation on all configuration commands having a designated configuration tag in accordance with some embodiments.

Referring to FIG. 5, a diagram is shown to illustrate the use of a tag-based command to perform a designated operation on all configuration commands having a designated configuration tag. In this example, the tag-based command takes the form: "<tag-based indicator> <operation> <tag>". The first part of the tag-based command—<tag-based indicator>—indicates that this is a tag-based command. One example of such an indicator is the indicator "switch #configuration-tag", which is used in some of the example tag-based commands described below. The second part of the tag-based command—<tag>—is where the particular tenant or desired group of configuration items is designated in the command. In other words, <tag> is replaced with the actual configuration tag associated with, e.g., the tenant whose configuration items will be operated upon. The last part of the tag-based command—<operation>—is replaced with the desired operation to be performed on the configuration items (e.g., show, delete, disable, etc.) This operation will be performed on each of the configuration items associated with the tag.

In some embodiments, the configuration tag for each tenant may simply serve as an identifier for the corresponding tenant. In other embodiments, the configuration tag may include subparts which are used to identify groupings of configuration commands other than simply those associated with a particular tenant. These subparts are referred to herein as "labels". Thus, a configuration tag appended to a particular configuration command may include a component which identifies the tenant, as well as one or more labels which identify other groupings in which the command may be included. The groupings based on the labels in the configuration tags may be groupings within the commands associated with a single tenant, or the label groupings may extend across multiple tenants. The ability to identify and operate on groupings of configuration commands that are associated with, for example, a particular feature rather than (or as well as) a particular tenant further extends the utility of the tag-based commands and allows the administrative user to perform, with a single-touchpoint, operations on multiple configuration commands across multiple tenants.

Figure 6:
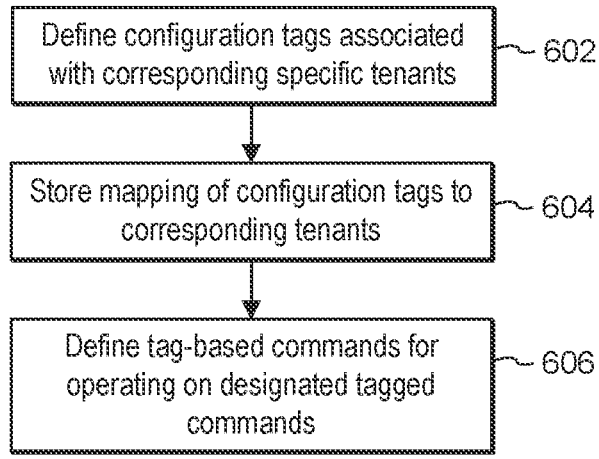
FIG. 6 is a flow diagram illustrating a method for preparing configuration tags and tag-based commands for use in a service in accordance with some embodiments.

Referring to FIGS. 6-9, a set of flow diagrams are shown to illustrate several methods related to the use of configuration tags in accordance with some embodiments. FIG. 6 is a flow diagram illustrating a method for preparing configuration tags and tag-based commands for use in a service. The method is performed in order to set up information which is used in the addition of tenant-specific configuration items and the modification of items based on their association with particular tenants or particular groups.

The method of FIG. 6 includes defining configuration tags that are associated with corresponding tenants (602). The configuration tags may be arbitrarily defined, although specific implementations may implement corresponding constraints on the configuration tags for compatibility, storage space, or various other purposes. The defined configuration tags are stored in a mapping with the corresponding tenants (604) in order to allow the configuration items associated with a particular tenant to be identified by the corresponding tags (i.e., to enable per-tenant operations to be performed on the configuration items). The method also includes defining tag-based commands to be used with the configuration tags (606). Each tag-based command definition specifies how a designated operation is performed on the configuration items that are tagged with a designated configuration tag or label.

Figure 7:
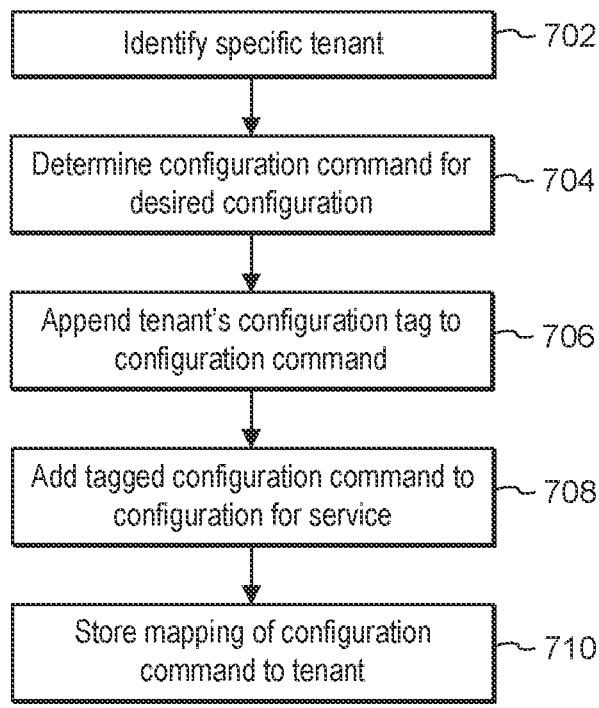
FIG. 7 is a flow diagram illustrating a method for adding a configuration item to a configuration for a service in accordance with some embodiments.

FIG. 7 is a flow diagram illustrating a method for adding a configuration item to a configuration for a service. This method can be used, for example, in the onboarding of a new tenant, when the various features of the service need to be configured for the tenant. The method may be performed by an administrative user, for example. In this method, a specific tenant (e.g., the tenant being onboarded) is identified (702). A configuration command is then determined based on a feature that is to be configured for the tenant (704). The configuration tag corresponding to the tenant is then appended to the configuration command (706) and the tagged command is added to the configuration (708). In some embodiments, a mapping of the configuration command to the onboarded tenant is stored (710) so that the relationship can be more easily determined for configuration maintenance or other purposes.

Figure 8:
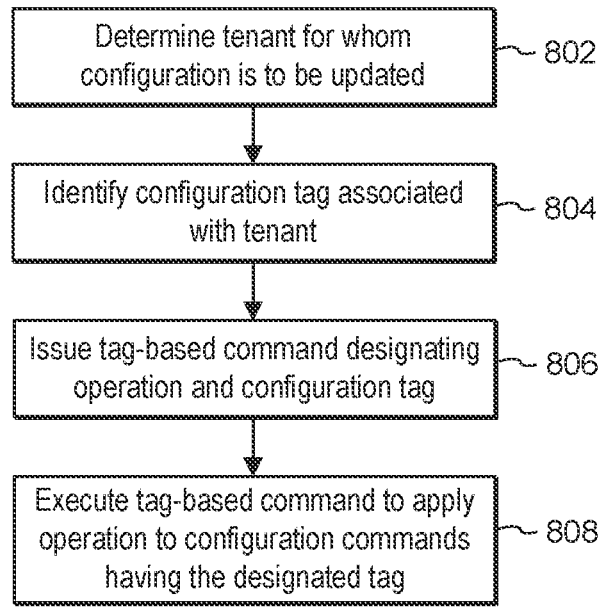
FIG. 8 is a flow diagram illustrating a method for using a tag-based command to modify configuration items associated with a particular tenant in accordance with some embodiments.

FIG. 8 is a flow diagram illustrating a method for using a tag-based command to modify configuration items associated with a particular tenant. After a tenant has been onboarded to a service, there may be a need to modify the configuration of the features for the tenant. The use of tag-based commands to modify the configuration items tagged with the tenant's configuration tag can simplify this process.

In the method of FIG. 8, it is first determined which tenant's configuration needs to be updated (802). The specific configuration tag associated with this tenant is identified (804) and one of the tag-based commands is issued, where the tag-based command designates the operation to be performed on the configuration items as well as the configuration tag for the tenant (806). The tag-based command is then executed, and the designated operation is performed on all of the configuration items that are tagged with the designated configuration tag (808). The update of the configuration items is therefore accomplished with a single touchpoint (the single tag-based command), rather than requiring separate commands to be issued to individually update the different features for the tenant.

Figure 9:
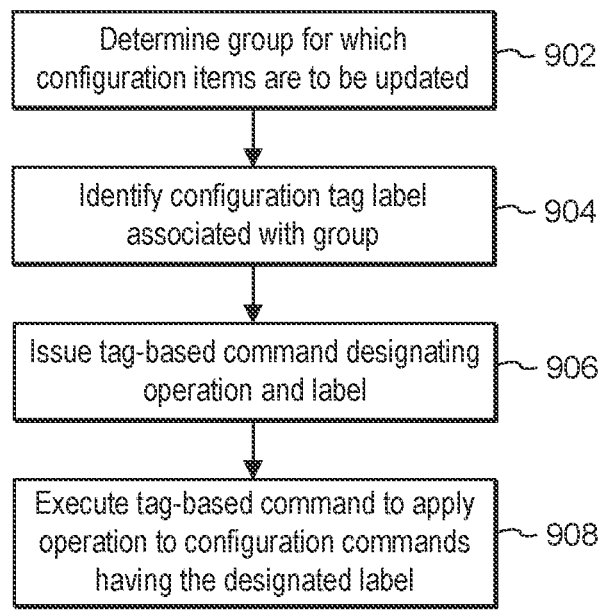
FIG. 9 is a flow diagram illustrating a method for using a tag-based command to modify configuration items associated with a particular grouping in accordance with some embodiments.

FIG. 9 is a flow diagram illustrating a method for using a tag-based command to modify configuration items associated with a particular grouping. This method is similar to the method of FIG. 8, but it makes use of a label that is contained in some of the configuration tags that are appended to the configuration commands. In this method, rather than determining a specific tenant, a desired group of configuration items is determined (902). This group may include only configuration items for a particular tenant, or it may cross multiple tenants. When the desired group has been identified, the label corresponding to the group can be identified (904). The label may be included within the configuration tags of one or more of the tenants. A tag-based command is then issued, the command designating the label and the operation desired to be performed on the configuration items with the designated label (906). The operation designated by the tag-based command is then performed on the configuration items with the designated label (908).

Figure 10:
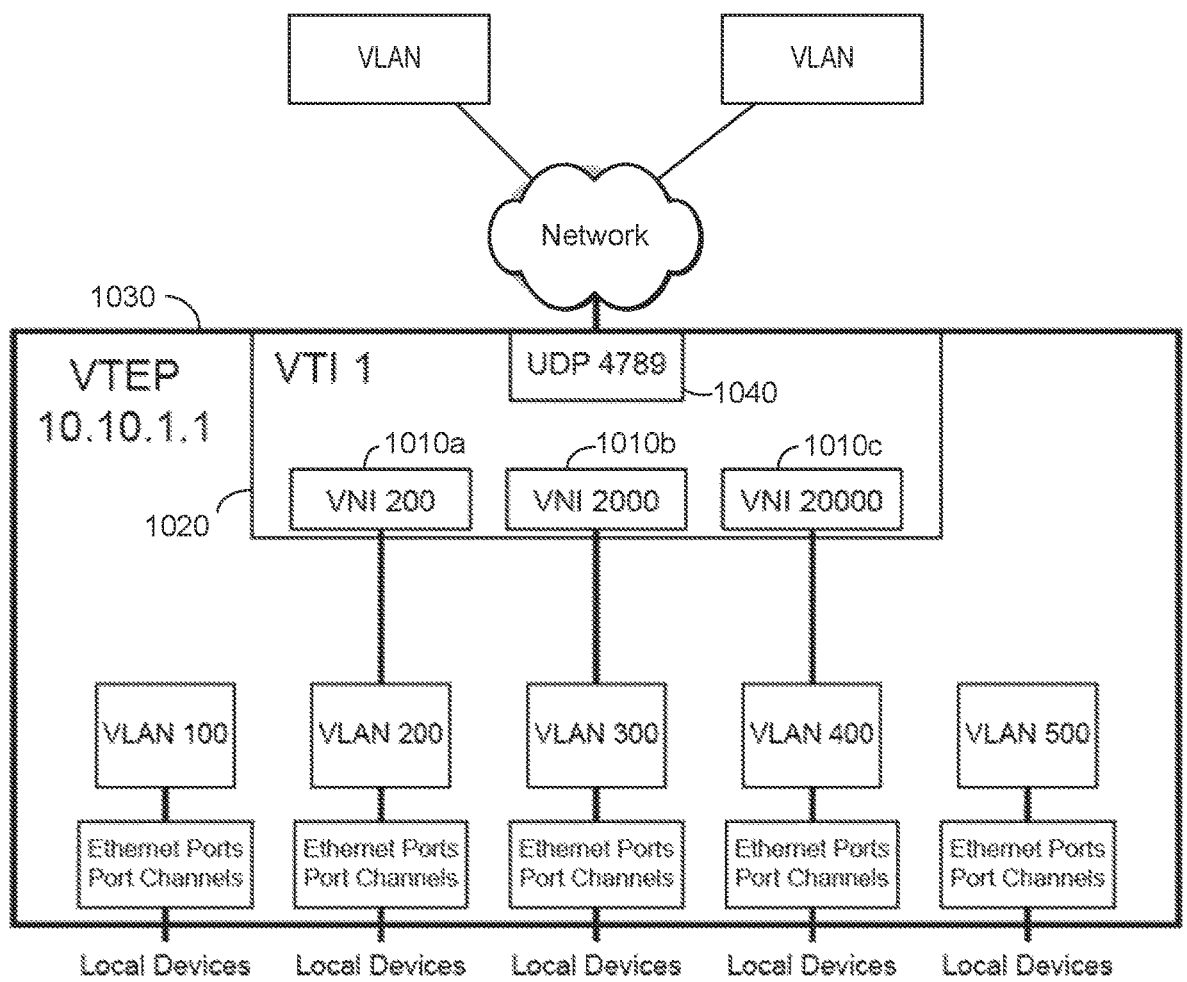
FIG. 10 is a block diagram illustrating a diagram illustrating the architecture of a Virtual Extensible LAN (VXLAN) in an example system.

The tagged configuration commands and the tag-based commands may be implemented in a variety of different systems. For example, one embodiment is implemented in an extensible operating system (EOS) for cloud networking. FIG. 10 is a diagram illustrating the architecture of a Virtual Extensible LAN (VXLAN) in an example system.

The EOS uses an architecture for a VXLAN that extends a Level 2 (L2) network by connecting Virtual LANs (VLANs) from multiple hosts through User Datagram Protocol (UDP) tunnels called VXLAN segments 1010. VXLAN segments are identified by a 24-bit Virtual Network Identifier (VNI). The VNI is a 24-bit number that distinguishes between the VLANs carried on a VXLAN Tunnel Interface (VTI). It facilitates the multiplexing of several VLANs over a single VTI. Within a host, each VLAN whose network is extended to other hosts is associated with a VNI. An extended L2 network comprises the devices attached to VLANs from all hosts that are on VLANs that are associated with the same VNI. VXLAN segments are collectively represented by a VTI 1020. VXLAN Tunnel End Point (VTEP) 1030 is a host with at least one VTI. VTIs 1020 are switchports linked to a UDP socket 1040 that is shared with VLANs on various hosts. Packets bridged from a VLAN to the VTI are sent out via the UDP socket with a VXLAN header. Packets arriving on the VTI through the UDP socket are demultiplexed to VLANs for bridging.

VXLANs extend VLANs through the use of a VXLAN address table that correlates remote MAC addresses to their port and resident host IP address. Packets that are destined to a remote device are sent to the VXLAN tunnel interface (VTI), which is the switchport that is linked to the UDP socket. The packet is encapsulated with a VXLAN header which includes the VNI associated with the VLAN and the IP mapping of the destination host. The packet is sent through a UDP socket to the destination VTEP IP. The VTI on the remote host extracts the original packet and bridges it to the VLAN associated with the VNI on the remote host.

The configuration model for the VXLAN is based on an interface that represents all the VTEPs. In alternative embodiments, the configuration model can represent each VTEP as a unique interface. In the first model, one VTI is created to represent the transition to all VTEPs. In this model, the VTI has one source IP address that is shared by all the VXLAN segments originating out of it. The VTI is named the "vxlan" interface.

In general, when a VLAN delivers a packet to the VTI, the VTI logically does the following: it looks up the VLAN in the VLAN-to-VNI map to get the VNI for the packet; it looks up the (VNI, MAC) pair to get the IP address for the egress VTEP to which the packet needs to be tunneled; it adds a VXLAN header to the packet including the VNI; it picks a source UDP port based on the hash of the inner packet headers; and it sends the packet via a UDP socket to the egress VTEP IP address.

When a packet arrives on the UDP socket at a VTI, the following occurs: the VNI of the packet (in the VXLAN header) is identified; the VLAN of the packet is looked up in the VNI-to-VLAN map; the packet is decapsulated; and the packet is sent to the bridging domain of the VLAN.

The "interface vxlan" submode allows attributes to be configured that apply to all VNIs transitioning via the VTI. However, certain attributes can be overridden for specific VNIs within the 'interface vxlan' sub mode. For example:

```
interface vxlan1
    vxlan source-interface Loopbackn -- for e.g. loopback0
    vxlan udp-port <port>
```

```
    vxlan vlan <vlan> vni <vni>
    vxlan vrf <vrf-name> vni { <vni> | [decapsulation] <vni-list> }
```

Static MAC addresses located at a remote VTEP are configured in the global mode just like other static MAC addresses with the difference that the VTEP is specified along with the interface:

```
    mac address-table static <mac-address> vlan <vlan> interface
    <vti>
            vtep <ip-address>
```

That is, a VNI represents a forwarding/bridging domain mapped from a VLAN. There are multiple VTEPs for a given VNI (it is therefore a broadcast domain). A remote host reachable via L2 sits behind a VTEP in a given VNI (forwarding domain). So, when a MAC DA lookup is performed in a given VLAN, the reachability is behind a remote VTEP and the lookup VLAN is mapped to a VNI to be put in the VNI field of the VXLAN packet.

IP hosts located at a remote VTEP will be configured in the global mode just as other static IP routes are configured today with the difference that the VTEP is specified along with the interface:

```
    ip route vrf <vrf> <prefix> vtep <ip-address> vni <vni> router-
    mac-address <router-mac> local-interface <vti>
```

Thus, as with L2, a remote host reachable via L3 sits behind a VTEP in a given VNI (forwarding domain), so when an IP DA lookup is performed in a given VRF, the reachability is behind a remote VTEP and the specified VNI is mapped to a VNI to be put in the VNI field of the VXLAN packet.

As can be seen in these examples, the configuration model fits well within the logical model of what a VXLAN segment/network represents. In this model, a VNI is a "forwarding/broadcast" domain with each VTEP participating in that VNI. Therefore, in the EOS generalized model, to represent VXLAN architecture, a remote VTEP is really a L2 endpoint for a given VNI. It is possible for a given (remote) VTEP to be part of multiple VNIs. In a sense, this is similar to a "switchport" carrying multiple VLANs (of global VLAN space). The individual VLANs are not represented in any form of interface (unless the VLAN space becomes port-local for things like a sub-interface, which does not apply here).

Based on the above, to represent a VNI endpoint on a VTI is not a clean model to represent as L3 tunnel to which to point the routes, especially since this is an L2 Tunnel (L2-in-L2) as opposed to L3 tunnels like Generic Routing Encapsulation (GRE) (which are L3-in-L3). In the latter GRE case, this fits within the model of a L3 tunnel interface with its own Source IP/Destination IP (SIP/DIP)/Key etc. and with routes that point to the GRE tunnel. In the context of the present embodiments, managing a customer and the customer's VNET requires configuration of multiple things outside of a tunnel, and de-provisioning is much more than just removing a route pointing to the VNI/VTI.

In the example of the EOS, routes are programmed based on customer onboarding and a given customer can be enrolled in multiple Virtual Networks (VNETs), where a VNET denotes a VTI-VNI tuple.

A typical conventional configuration for a VNET would look like this:

```
interface Vxlan1
    vxlan source-interface Loopback1
    vxlan udp-port 4789
    vxlan vrf red vni 123456
    ip route vrf red 10.11.12.13/32 vtep 5.6.1.2 vni 123456 router-
    mac-address 00:03:00:03:00:03
    ip route vrf red ...
```

To unconfigure a VNET from a customer's configuration, it is necessary to delete multiple routes and VRF to VNI mapping, which in some cases is prone to errors (e.g., because of bugs in a system controller, in instances where manual configuration is performed, etc.) It is therefore desirable to have a single touchpoint, especially when it is necessary to de-provision a specific VNET for a customer without affecting other VNETs and other customers. In order to satisfy this requirement and make the configuration group/unit management more extensible, the use of "configuration tags" is implemented.

Each command is allowed to have a suffix "configuration-tag <tag>" and the tag is then stored along with the TAC model to which the command writes (where configuration-tag indicates that a customer's configuration tag follows, and where <tag> is the actual customer-specific tag).

In this embodiment, a configuration tag is a string. The tag uses the format:

TAG:=<TAG-STRING>

The tag string in this example is case insensitive. The maximum tag string length is 255 characters, but this may differ in other embodiments. Commas are not allowed in this embodiment except when labels are used. This system provides for a maximum of 4000 configuration tags and a maximum of 255 labels, although these limits may vary in other embodiments. This system allows a maximum of four labels per tag (which can vary in other embodiments). This embodiment provides no support for partial string matching or regular-expression-based matching of tags or labels, but this can be supported in other embodiments. The order of labels in each configuration command is preserved when the configuration is saved.

In this example, the configuration items are added, modified, deleted, etc. as configuration commands in a command line interface. Below are examples of tag-based commands that are defined for use in configuring features for the customers of the system.

To add a configuration tag to an existing configuration command:

Switch(config) #<configuration-command> configuration-tag <tag>

To show all configuration commands with a given tag:

Switch #show running-config tag <tag>

To delete all configuration commands with a given tag:

Switch #configure tag <tag> remove configuration

To disable all configuration commands for a given tag:

Switch(config) #configuration-tag <tag> disabled

To enable all configuration commands for a given tag:

Switch(config) #no configuration-tag <tag> disabled

Since the system supports the use of configuration tags on a subset of configuration commands, the configuration now looks like the following:

```
interface Vxlan1
    vxlan source-interface Loopback1
    vxlan udp-port 4789
    vxlan vrf red vni 123456 configuration-tag
    customer1,vnet1,redmond
    vxlan vrf red vni 567890 configuration-tag
    customer1,vnet2,redmond
    vxlan vrf red vni 888888 configuration-tag
    customer2,vnet2,paris
    ip route vrf red 10.11.12.13/32 vtep 5.6.1.2 vni 123456 router-
    mac-address 00:03:00:03:00:03 configuration-tag
    customer1,vnet1,redmond
    ip route vrf red 10.11.12.14/32 vtep 5.6.1.2 vni 567890 router-
    mac-address 00:03:00:03:00:03 configuration-tag
    customer1,vnet1,redmond
    ip route vrf red 88.99.12.13/32 vtep 5.1.1.2 vni 888888 router-
    mac-address 00:03:00:03:00:03 configuration-tag
    customer2,vnet2,paris
```

Since each of the configuration commands has a configuration tag appended to it, the tag-based commands that have been defined for the system can be used to operate on the configuration commands. In the example below, a tag-based command is used to show all of the configuration commands that are associated with customer1 (i.e., those tagged with the configuration tag "customer1,vnet1,redmond"). This tag-based command results in the two configuration commands for customer1 in the configuration above being displayed:

```
Switch# show running configuration configuration-tag
customer1,vnet1,redmond
interface Vxlan1
    vxlan vrf red vni 123456 configuration-tag
customer1,vnet1,redmond
ip route vrf red 10.11.12.13/32 vtep 5.6.1.2 vni 123456 router-
mac-address 00:03:00:03:00:03 configuration-tag
customer1,vnet1,redmond
```

In the following example, a first, tag-based command is used to remove the configuration commands tagged with the configuration tag "customer1,vnet1,redmond", and then a second command is used to show all of the configuration commands associated with interface Vxlan1. The configuration commands which are displayed include those in the configuration above, except for the ones tagged with the configuration tag "customer1,vnet1,redmond", which were removed from the configuration as a result of the first, tag-based command.

```
Switch# configure tag customer1, vnet1, redmond remove
configuration
Switch# show running-configuration interface Vxlan1
interface Vxlan1
    vxlan vrf red vni 567890 configuration-tag
    customer1,vnet2,redmond
    vxlan vrf red vni 888888 configuration-tag
    customer2,vnet2,paris
```

There may be numerous alternative embodiments in addition to the examples described above that fall within the scope of the claims below. For example, one embodiment comprises a method for managing the configuration of per-tenant features in a multi-tenant server system. The method begins with identifying a configuration feature of the multi-tenant server system to be configured for a specific tenant. A configuration command is generated to configure the configuration feature for the specific tenant, wherein the configuration command includes a configuration tag associated with the specific tenant. The configuration command is stored in a configuration of the multi-tenant server system and is applied to the multi-tenant server system.

In some embodiments, the method further comprises providing one or more tag-based commands, each of which is operable to modify a subset of configuration features corresponding to configuration commands in the multi-tenant server system configuration that include a designated configuration tag which is specified with the tag-based command. In some embodiments, the method includes executing a first tag-based command which includes specifying a designated configuration tag for execution of the tag-based command and operating on a subset of the configuration commands that include the designated configuration tag. In some embodiments, the configuration tag associated with the tenant includes one or more labels, where the tag-based commands are operable to modify a subset of configuration features corresponding to configuration commands that are tagged with a designated one of the labels.

The tag-based command may be operable, for example, to remove or modify the subset of configuration commands that include the designated configuration tag, where the updated configuration without the removed subset of configuration commands (or with the modified configuration commands) is applied to the multi-tenant server system.

In some embodiments, the method further comprises providing, by the multi-tenant server system, a tenant interface to the computer network, where the tenant interface is configured according to the multi-tenant server system configuration. In some embodiments, the multi-tenant server system comprises an extensible operating system (EOS) of a computer network.

Alternative embodiments comprise systems including a computing system which executes a multi-tenant server system that is configured according to a set of configuration commands. The system also includes a configuration file stored in a data storage device, the configuration file containing a plurality of configuration commands, each of which configures a corresponding feature of the multi-tenant server system. At least a subset of configuration commands include corresponding configuration tags which identify corresponding tenants for which the configuration commands configure corresponding features. The multi-tenant server system also provides one or more tag-based commands, each of which specifies an associated configuration tag. Each tag-based command is operable to modify a subset of configuration features corresponding to configuration commands in the configuration file that include the specified configuration tag.

Alternative embodiments further include computer program products comprising non-transitory computer-readable media storing instructions executable by one or more processors. The instructions are executable to perform a method that includes identifying configuration features of a multi-tenant server system to be configured for corresponding tenants. The method further includes generating configuration commands to configure the configuration features for the corresponding tenants, where the configuration commands include configuration tags associated with the corresponding tenants and storing the configuration commands in a configuration of the system. The instructions are further executable to apply the configuration to the multi-tenant server system. One or more tag-based commands are provided, each of which is operable to modify a subset of configuration features corresponding to configuration commands in the system configuration that include designated configuration tags specified with the tag-based commands. The method further includes executing the tag-based commands to operate on the indicated subset of the configuration commands in the multi-tenant server system configuration.

Alternative embodiments further include a method for managing the configuration of individual features in a server system, the method including receiving an indication of a configuration feature of the server system to be configured for a specific user and, in response to receiving the indication, generating a configuration command to configure the configuration feature for the specific user, where the configuration command includes a configuration tag associated with the specific user. The configuration command is then stored in a configuration of the server system. The sys then selectively operates on a subset of the configuration, where the subset includes only those configuration commands which include the configuration tag associated with the specific user.

Alternative embodiments further include a system having a computing system executing a server and a configuration file which is stored in a data storage device and contains a set of configuration commands that configure corresponding features of the server system. The configuration commands include corresponding configuration tag that identify groupings of the configuration commands. The server system enables one or more tag-based commands, where each tag-based command specifies a configuration tag and is operable to modify a subset of configuration features corresponding to configuration commands in the configuration file that include the specified configuration tag.

Alternative embodiments further include a computer program product comprising a non-transitory computer-readable medium storing instructions executable by one or more processors to perform a method that includes receiving indicators of configuration features of a server system to be configured and generating corresponding commands to configure the features, where the configuration commands include configuration tags that are associated with corresponding groupings. The configuration commands are stored in a configuration that is applied to the server system. One or more of a set of provided tag-based commands are executed to modify a subset of the configuration commands in the server system configuration that include a designated configuration tag.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

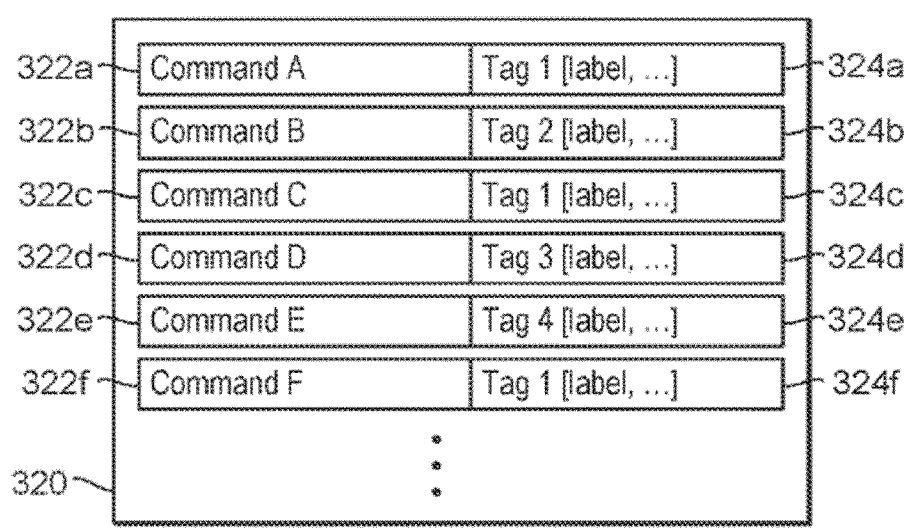

What is claimed is:

1. A method for managing the configuration of individual features in a server system, the method comprising:
   receiving a configuration command for a configuration feature of the server system to be configured for a specific user, wherein the configuration command includes an association with an operation for the configuration feature of the server system and a configuration tag associated with the specific user;
   storing the configuration command in a configuration of the server system the configuration comprising one or more configuration commands; and
   selectively operating on a subset of the configuration of the server system, the subset of the configuration defined by the configuration commands in the configuration that include the configuration tag associated with the specific user, wherein selectively operating on the subset of the configuration comprises executing the operation associated with the configuration command to configure the configuration feature of the server system.

2. The method of claim 1, further comprising providing, by the server system, one or more tag-based commands, each of the tag-based commands operable to modify a subset of configuration features corresponding to configuration commands in the server system configuration that include a designated configuration tag specified with the tag-based command.

3. The method of claim 2, further comprising executing a first tag-based command of the one or more tag-based commands, the executing including: receiving a designated configuration tag associated with the execution of the first tag-based command; operating on a subset of the configuration commands that include the designated configuration tag.

4. The method of claim 3, wherein the first tag-based command is operable to remove from the server system configuration the subset of configuration commands that include the designated configuration tag, and wherein the server system configuration that does not have the removed subset of configuration commands is applied to the server system.

5. The method of claim 3, wherein the first tag-based command is operable to modify the subset of configuration commands that include the designated configuration tag, and wherein the server system configuration with the modified subset of configuration commands is applied to the server system.

6. The method of claim 2, wherein the configuration tag associated with the specific user includes one or more labels, wherein each of the tag-based commands is operable to modify a subset of configuration features corresponding to configuration commands in the server system configuration that include a designated one of the one or more labels.

7. The method of claim 1, further comprising providing, by the server system, a user interface to the computer network, the user interface configured according to the server system configuration.

8. The method of claim 1, wherein the server system comprises an extensible operating system (EOS) of a computer network.

9. A system comprising:
   a computing system configured to execute a server system, the server system configured according to a set of configuration commands; and
   a configuration file stored in a data storage device, the configuration file containing a plurality of configuration commands, each configuration command including an association with an operation adapted for configuring one or more corresponding features of the server system;
   wherein the plurality of configuration commands includes a first subset of configuration commands, wherein each of the configuration commands in the first subset includes a corresponding configuration tag which identifies a corresponding grouping for which the operation associated with the configuration command is adapted for configuring a corresponding feature; and
   wherein the server system enables one or more tag-based commands, each of the tag-based commands specifying an associated configuration tag, wherein the tag-based command is operable to modify a subset of configuration features, the subset of configuration features defined by configuration commands in the configuration file that include the specified configuration tag.

10. The system of claim 9, wherein the server system comprises an extensible operating system (EOS) of a computer network.

11. The system of claim 9, wherein one or more of the configuration tags contains a grouping identifier.

12. The system of claim 9, wherein one or more of the configuration tags contains an identifier of a subgroup of configuration features.

13. The system of claim 9, wherein the server system is configured to provide, for each of a plurality of users, a corresponding user interface which is configured according to a subset of the configuration commands which include configuration tags that identify the user.

14. The system of claim 9, wherein for at least one of the configuration tags, the configuration tag includes one or more labels, wherein each of the tag-based commands is operable to modify a subset of configuration features corresponding to configuration commands in the configuration file that include a designated one of the one or more labels.

15. The system of claim 9, wherein the server system comprises an extensible operating system (EOS) of a computer network.

16. A computer program product comprising a non-transitory computer-readable medium storing instructions executable by one or more processors to perform:
   receiving configuration commands to configure configuration features of a server system, wherein the configuration commands include configuration tags associated with corresponding groupings;
   storing the configuration commands in a configuration of the server system;
   applying the configuration to the server system;
   executing an operation of one or more tag-based commands, each of the operations of the tag-based commands operable to modify a subset of configuration features defined by configuration commands in the server system configuration that include designated configuration tags specified with the tag-based commands; and
   executing the tag-based commands to operate on a subset of the configuration commands in the server system configuration.

17. The computer program product of claim 16, wherein a first tag-based command is operable to remove from the server system configuration a subset of configuration commands that include the designated configuration tag, and wherein the server system configuration without the removed subset of configuration commands is applied to the server system.

18. The computer program product of claim 16, wherein a first tag-based command is operable to modify a subset of configuration commands that include the designated configuration tag, and wherein the server system configuration with the modified subset of configuration commands is applied to the server system.

19. The computer program product of claim 16, wherein one or more of the configuration tags include one or more labels, wherein one or more of the tag-based commands are operable to modify a subset of configuration features corresponding to configuration commands in the server system configuration that include a designated one of the one or more labels.

20. The computer program product of claim 16, wherein the server system comprises an extensible operating system (EOS) of a computer network.

\* \* \* \* \*

UNITED STATES PATENT AND TRADEMARK OFFICE
CERTIFICATE OF CORRECTION

| | | |
|---|---|---|
| PATENT NO. | : 12,242,865 B2 | Page 1 of 5 |
| APPLICATION NO. | : 17/976268 | |
| DATED | : March 4, 2025 | |
| INVENTOR(S) | : Prasanna Parthasarathy, Navdeep Bhatia and Hua Zhong | |

It is certified that error appears in the above-identified patent and that said Letters Patent is hereby corrected as shown below:

On the Title Page

The Title page, should be deleted and substitute therefor with the attached Title page.

In the Claims

Replace Column 13, Line 1-Column 15, Line, (approx.) as follows:
1. A method for managing the configuration of individual features in a server system, the method comprising:
    receiving a configuration command for a configuration feature of the server system to be configured for a specific user, wherein the configuration command includes an association with an operation for the configuration feature of the server system and a configuration tag associated with the specific user;
    storing the configuration command in a configuration of the server system the configuration comprising one or more configuration commands; and
    selectively operating on a subset of the configuration of the server system, the subset of the configuration defined by the configuration commands in the configuration that include the configuration tag associated with the specific user, wherein selectively operating on the subset of the configuration comprises executing the operation associated with the configuration command to configure the configuration feature of the server system.

2. The method of claim 1, further comprising providing, by the server system, one or more tag-based commands, each of the tag-based commands operable to modify a subset of configuration features corresponding to configuration commands in the server system configuration that include a designated configuration tag specified with the tag-based command.

3. The method of claim 2, further comprising executing a first tag-based command of the one or more tag-based commands, the executing including: receiving a designated configuration tag Signed and Sealed this
Thirteenth Day of January, 2026

John A. Squires
*Director of the United States Patent and Trademark Office* associated with the execution of the first tag-based command; operating on a subset of the configuration commands that include the designated configuration tag.

4. The method of claim 3, wherein the first tag-based command is operable to remove from the server system configuration the subset of configuration commands that include the designated configuration tag, and wherein the server system configuration that does not have the removed subset of configuration commands is applied to the server system.

5. The method of claim 3, wherein the first tag-based command is operable to modify the subset of configuration commands that include the designated configuration tag, and wherein the server system configuration with the modified subset of configuration commands is applied to the server system.

6. The method of claim 2, wherein the configuration tag associated with the specific user includes one or more labels, wherein each of the tag-based commands is operable to modify a subset of configuration features corresponding to configuration commands in the server system configuration that include a designated one of the one or more labels.

7. The method of claim 1, further comprising providing, by the server system, a user interface to the computer network, the user interface configured according to the server system configuration.

8. The method of claim 1, wherein the server system comprises an extensible operating system (EOS) of a computer network.

9. A system comprising:
    a computing system configured to execute a server system, the server system configured according to a set of configuration commands; and
    a configuration file stored in a data storage device, the configuration file containing a plurality of configuration commands, each configuration command including an association with an operation adapted for configuring one or more corresponding features of the server system;
    wherein the plurality of configuration commands includes a first subset of configuration commands, wherein each of the configuration commands in the first subset includes a corresponding configuration tag which identifies a corresponding grouping for which the operation associated with the configuration command is adapted for configuring a corresponding feature; and
    wherein the server system enables one or more tag-based commands, each of the tag-based commands specifying an associated configuration tag, wherein the tag-based command is operable to modify a subset of configuration features, the subset of configuration features defined by configuration commands in the configuration file that include the specified configuration tag.

10. The system of claim 9, wherein the server system comprises an extensible operating system (EOS) of a computer network.

11. The system of claim 9, wherein one or more of the configuration tags contains a grouping identifier.

12. The system of claim 9, wherein one or more of the configuration tags contains an identifier of a subgroup of configuration features.

13. The system of claim 9, wherein the server system is configured to provide, for each of a plurality of users, a corresponding user interface which is configured according to a subset of the configuration commands which include configuration tags that identify the user.

14. The system of claim 9, wherein for at least one of the configuration tags, the configuration tag includes one or more labels, wherein each of the tag-based commands is operable to modify a subset of configuration features corresponding to configuration commands in the configuration file that include a designated one of the one or more labels.

15. A computer program product comprising a non-transitory computer-readable medium storing instructions executable by one or more processors to perform:
   receiving configuration commands to configure configuration features of a server system, wherein the configuration commands include configuration tags associated with corresponding groupings;
   storing the configuration commands in a configuration of the server system;
   applying the configuration to the server system;
   executing an operation of one or more tag-based commands, each of the operations of the tag-based commands operable to modify a subset of configuration features defined by configuration commands in the server system configuration that include designated configuration tags specified with the tag-based commands; and
   executing the tag-based commands to operate on a subset of the configuration commands in the server system configuration.

16. The computer program product of claim 15, wherein a first tag-based command is operable to remove from the server system configuration a subset of configuration commands that include the designated configuration tag, and wherein the server system configuration without the removed subset of configuration commands is applied to the server system.

17. The computer program product of claim 15, wherein a first tag-based command is operable to modify a subset of configuration commands that include the designated configuration tag, and wherein the server system configuration with the modified subset of configuration commands is applied to the server system.

18. The computer program product of claim 15, wherein one or more of the configuration tags include one or more labels, wherein one or more of the tag-based commands are operable to modify a subset of configuration features corresponding to configuration commands in the server system configuration that include a designated one of the one or more labels.

19. The computer program product of claim 15, wherein the server system comprises an extensible operating system (EOS) of a computer network.

(12) United States Patent
Parthasarathy et al.

(10) Patent No.: US 12,242,865 B2
(45) Date of Patent: Mar. 4, 2025

(54) ASSOCIATING TAGS TO CONFIGURATION ITEMS FOR TAG-BASED CONFIGURATION MANAGEMENT

(71) Applicant: Arista Networks, Inc., Santa Clara, CA (US)

(72) Inventors: Prasanna Parthasarathy, Cupertino, CA (US); Navdeep Bhatia, Sunnyvale, CA (US); Hua Zhong, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 179 days.

(21) Appl. No.: 17/976,268

(22) Filed: Oct. 28, 2022

(65) Prior Publication Data
US 2024/0143342 A1 May 2, 2024

(51) Int. Cl.
*G06F 9/44* (2018.01)
*G06F 9/445* (2018.01)

(52) U.S. Cl.
CPC .................. *G06F 9/4451* (2013.01)

(58) Field of Classification Search
CPC ............... G06F 1/32; G06F 1/12; G06F 9/44
See application file for complete search history.

(56) References Cited

U.S. PATENT DOCUMENTS

| | | | |
|---|---|---|---|
| 6,529,985 B1 * | 3/2003 | Deianov | G06F 9/54 718/107 |
| 7,565,416 B1 | 7/2009 | Shafer | |
| 9,094,299 B1 | 7/2015 | Rao | |
| 2003/0225867 A1 * | 12/2003 | Wedlake | H04L 41/0893 709/222 |
| 2019/0205924 A1 * | 7/2019 | Rusiecki | G06Q 30/0276 |

OTHER PUBLICATIONS

European Search Report for Application No. EP 23206373.5, dated Feb. 29, 2024, 10 pages.
CloudVision Configuration Guide, retrieved at https://usermanual.wiki/m/e08e11ab5573702dc4a438a70235f10b388c5616893d083e02344cb682399d4c.pdf, Arista Networks, Inc., Santa Clara, CA, Version 2020.3.0 v1, Feb. 2021, 388 pgs.

* cited by examiner

*Primary Examiner* — Keshab R Pandey
(74) *Attorney, Agent, or Firm* — Sprinkle IP Law Group

(57) ABSTRACT

Systems, methods and products for associating arbitrary configuration tags to configuration item for a service so that items grouped by the tags can be unconfigured or manipulated as a group with minimal touchpoints. In one embodiment, a method is provided for managing the configuration of per-tenant features in a server system. The method includes identifying a configuration feature of the server system to be configured for a specific tenant. A configuration command is received to configure the configuration feature for the specific tenant, wherein the configuration command includes a configuration tag associated with the specific tenant. The configuration command is stored in a configuration of the server system and is applied to the server system. Tag-based commands are provided which are operable to modify a subset of configuration features corresponding to a designated configuration tag.

19 Claims, 5 Drawing Sheets